Inventor:
Farnum F. Dorsey

Patented Feb. 2, 1926.

1,571,511

UNITED STATES PATENT OFFICE.

FARNUM F. DORSEY, OF ROCHESTER, NEW YORK, ASSIGNOR TO NORTH EAST ELECTRIC COMPANY, OF ROCHESTER, NEW YORK, A CORPORATION OF NEW YORK.

LOCK WASHER.

Application filed February 19, 1924. Serial No. 693,905.

*To all whom it may concern:*

Be it known that I, FARNUM F. DORSEY, a citizen of the United States, residing at Rochester, in the county of Monroe and State of New York, have invented certain new and useful Improvements in Lock Washers; and I do hereby declare the following to be a full, clear, and exact description of the invention, such as will enable others skilled in the art to which it appertains to make and use the same.

This invention relates to washers for the purpose of locking nuts, cap-screws and the like against rotation and loosening.

The object of the invention is to produce a lock-washer which will be secure and reliable in use, and simple in application, and which may be made cheaply from sheet-metal.

To the foregoing end the invention resides in a washer embossed, by a stamping operation, to provide a conical socket in which the nut or the screw-head embeds itself in the operation of screwing it home, and thus automatically forms a polygonal socket conforming closely to its periphery.

Figure 1:
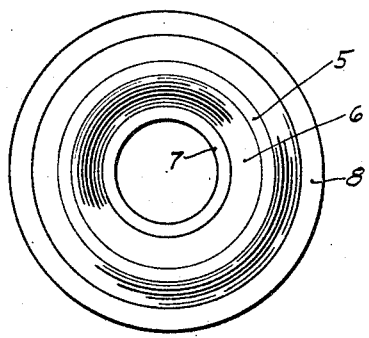
Figure 2:
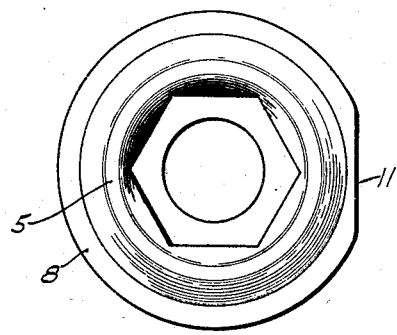
Figure 3:
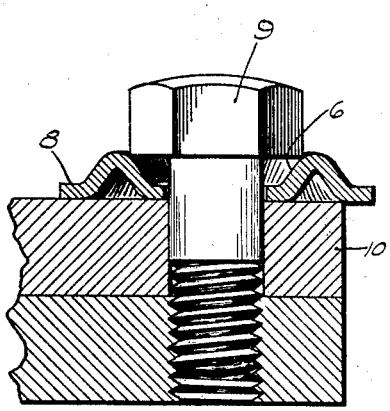
Figure 4:
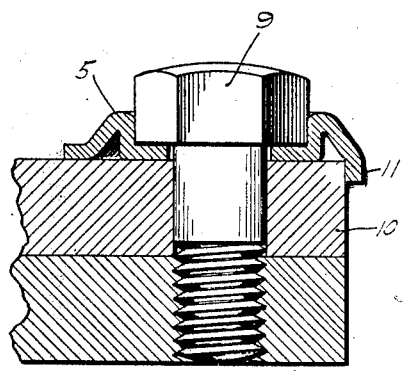

In the accompanying drawings, Figs. 1 and 2 are plan-views of a lock-washer embodying the present invention, showing it, respectively, before and after the alterations in its shape incident to its use; and Figs. 3 and 4 are vertical sectional views showing the lock-washer in connection with a cap-screw and the parts secured together thereby, Fig. 3 showing the washer before, and Fig. 4 after the screw has been driven home.

The washer of the present invention comprises a disc of sheet-metal, centrally perforated in the usual manner, but embossed to provide, on the upper surface, an annular ridge 5, with a conical inner surface 6 concentric with the central perforation. The inner and outer margins 7 and 8 of the disc are left flat.

This washer is used in connection with a nut or a screw-head 9 of the usual polygonal form and of a diameter slightly less than the greatest diameter of the conical recess formed by the face 6. When the screw is driven home the corners of the head bite into the sheet-metal and cause the washer to rotate with the screw, and as this movement is continued the sheet-metal yields and bends, so that the angles of the head form corresponding recesses in the washer. When the screw-head is finally seated upon the inner margin 7 the inner part of the ridge 5 has taken the form of a polygonal socket closely embracing the screw-head.

This washer is designed for use particularly where the screw is used to secure together two parts and is located near the edge of the upper part 10, as shown in Figs. 3 and 4. After the screw has been driven home the projecting margin of the washer may be bent down over the edge of the part 10 so as to produce a lip 11 which prevents rotation of the washer. Since the screw cannot turn independently of the washer, it is then securely locked.

The invention claimed is:

In combination with a screw-threaded fastening device with a head of polygonal form: a lock-washer comprising a disc, of sheet-metal, perforated to receive the body of said fastening-device and embossed to provide an annular hollow ridge with an inclined inner surface forming a conical socket for the reception of said head: said socket being greater in maximum diameter and less in minimum diameter than the head.

FARNUM F. DORSEY.